April 21, 1953   D. J. DONAHOE ET AL   2,635,580
TEMPERATURE CONTROLLED WATER TANK
Filed June 28, 1951   3 Sheets-Sheet 1
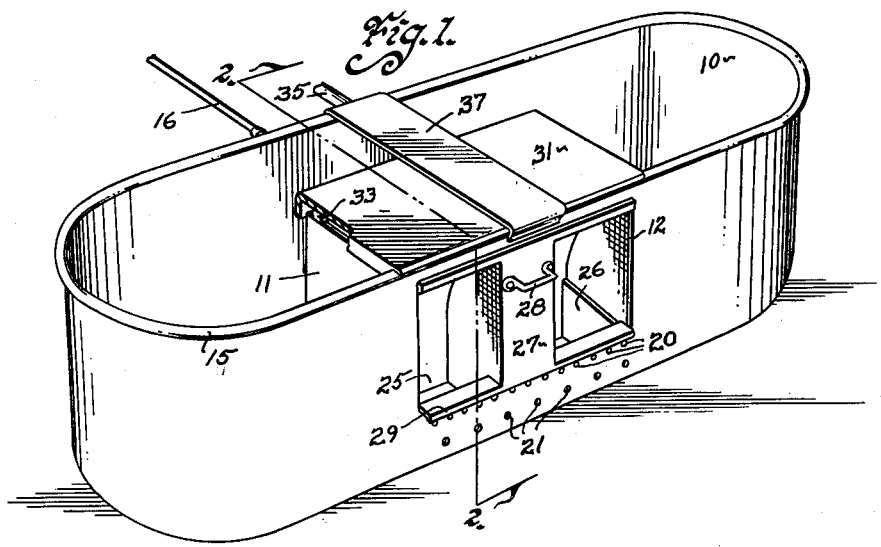
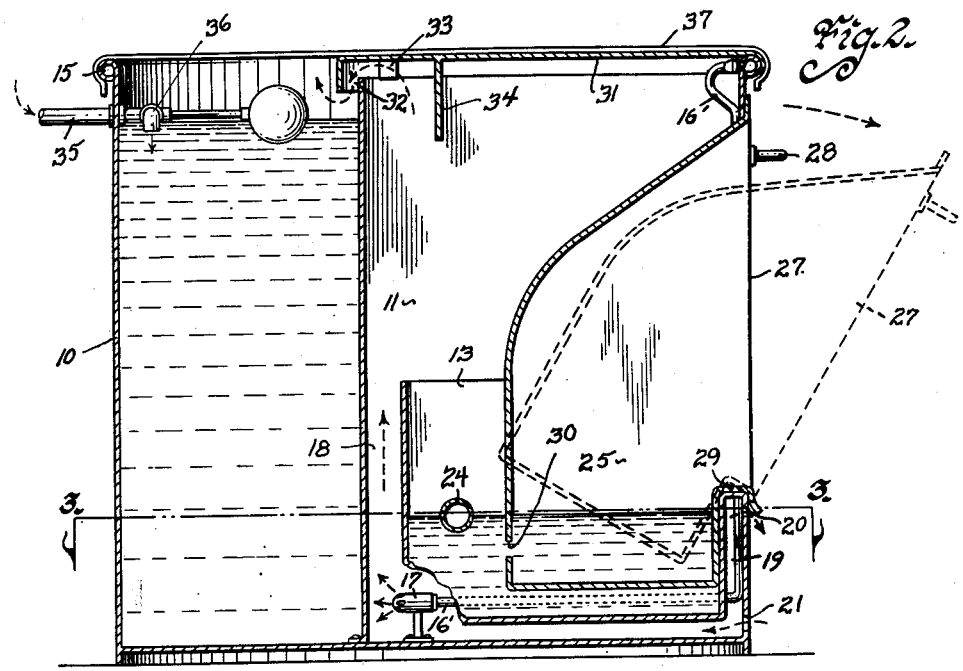
Inventors
Donald J. Donahoe & Paul J. Donahoe
by M. Talbert Dick
Attorney
Witness
Edward P. Seeley April 21, 1953  D. J. DONAHOE ET AL  2,635,580
TEMPERATURE CONTROLLED WATER TANK
Filed June 28, 1951  3 Sheets-Sheet 2
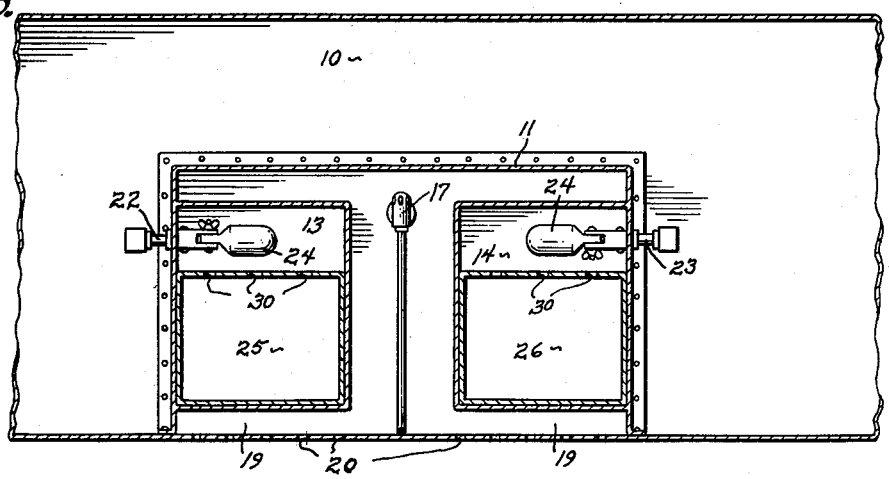
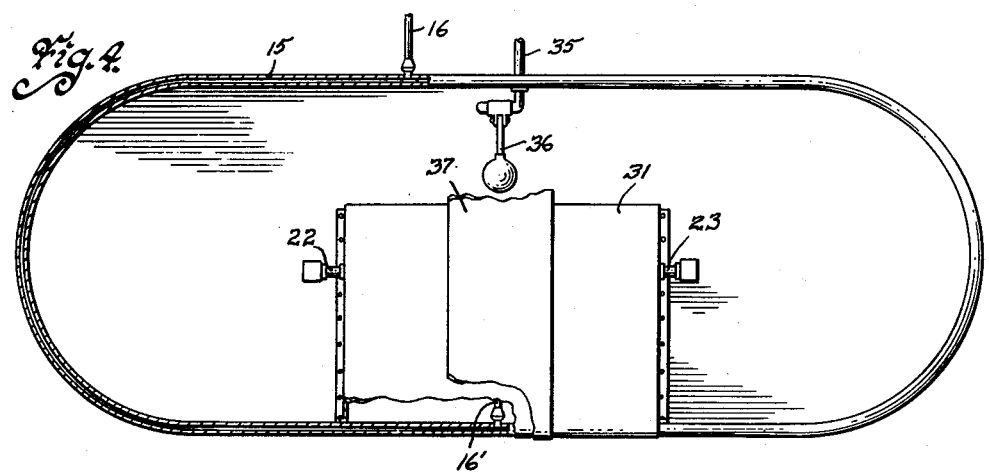
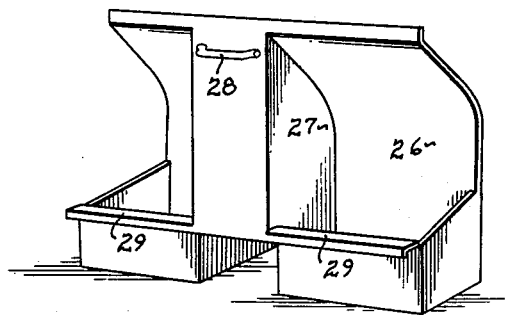
Inventors
Donald J. Donahoe
& Paul J. Donahoe
by M. Talbert Dick
Attorney
Witness
Edward P. Seeley

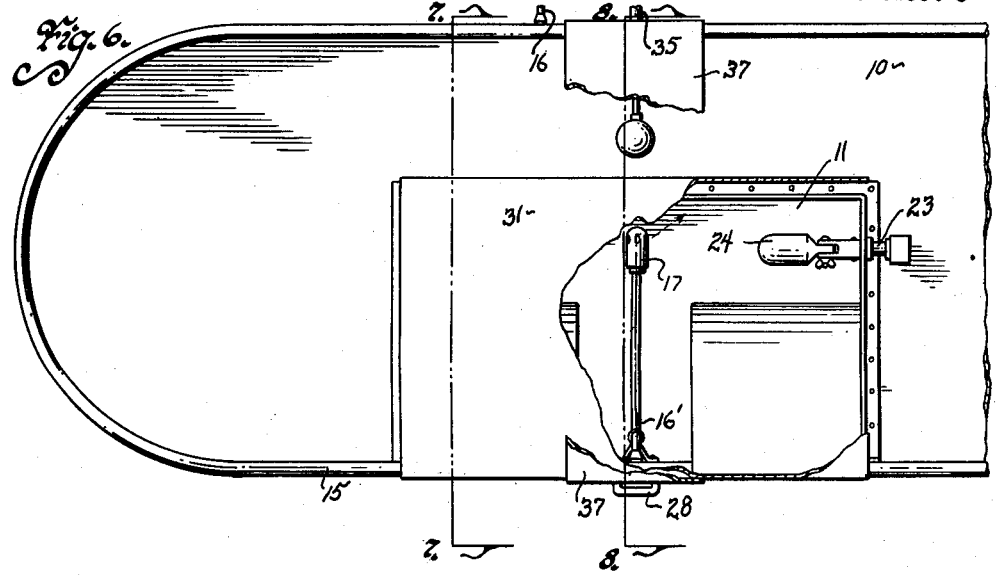
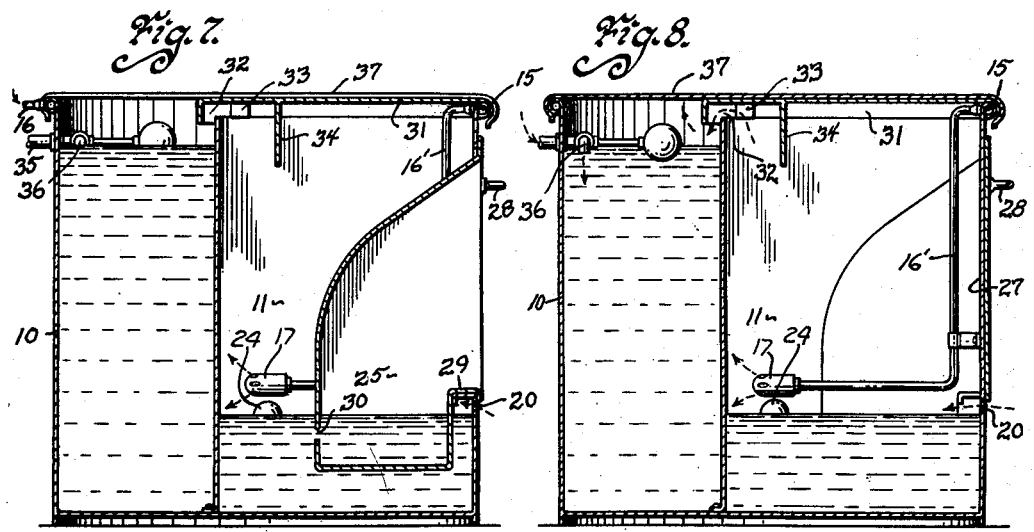

Patented Apr. 21, 1953

2,635,580

UNITED STATES PATENT OFFICE 2,635,580

TEMPERATURE CONTROLLED WATER TANK

Donald J. Donahoe and Paul J. Donahoe, Fort Dodge, Iowa

Application June 28, 1951, Serial No. 234,002

12 Claims. (Cl. 119—73)

Our present invention relates to heatable water tanks for the use of both large and small animals and is an improvement on our heatable water tank, Patent No. 2,532,999, under date of December 5, 1950, and is a continuation in part of our application entitled a Heatable Water Tank, filed May 19, 1950, Serial No. 162,969 and now abandoned.

The use of heatable stock tanks by raisers of livestock is old. However, such tanks usually have been of the fountain type, are very complicated, and the mechanical features, including the heating means, is not adaptable to the standard elongated type water tank such as is now in general usage in all farm sections. Furthermore, such tanks are not easily serviced and are most difficult to clean. Another objection to these tanks are that they provide facilities only for large animals or for small animals. The result is that if both large and small animals are to be furnished with warm drinking water in the cold months of the year, separate tanks must be employed.

Therefore, the prime object of our invention is to take a standard elongated stock water tank and reconstruct it so that the water therein will be maintained at a temperature above freezing and be available to both large and small animals.

A further object of our invention is to provide a heated water stock tank for both large and small animals that warms all of the water in all of the water compartments from a single heating chamber.

A still further object of this invention is to provide a large and small animal water tank that permits that portion from which the smaller animals drink to be kept in a clean and sanitary condition.

A still further object of our invention is to provide a heatable stock water tank that is capable of keeping the water from freezing at very low cost.

A still further object of this invention is to provide a heatable water tank that is easily serviced and one that the heating means may be easily and quickly ignited.

A still further object of our invention is to provide a large and small animal water tank wherein the float valves for controlling water level in the various compartments are protected from damage by the drinking animals.

A still further object of our invention is to provide a heatable water tank that employs an economical construction for the burner fuel conducting conduit.

A still further object of this invention is to provide a heatable stock water tank in combination for both small and large animals that is economical in manufacture, refined in appearance, and durable in use.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

Fig. 1 is a perspective view of our tank ready for use,

Fig. 2 is an enlarged cross-sectional view of the tank taken on line 2—2 of Fig. 1, Fig. 3 is an enlarged fragmentary plan sectional view of our tank taken on line 3—3 of Fig. 2, and drawn to a scale intermediate of that used in Figs. 1 and 2, Fig. 4 is a top plan view of our tank taken with sections cut away to more fully illustrate its structure, Fig. 5 is a perspective view of the removable small animal drinking compartments portion, Fig. 6 is an enlarged top plan view of our tank employing a slightly higher position for the heating burner. The burner must be so arranged when separate reservoirs for the small animal waterers are eliminated. Portions of the tank are cut away to more fully illustrate the construction. The scale used is substantially that employed in Fig. 3, Fig. 7 is an enlarged cross-sectional view of our single reservoir tank taken on the line 7—7 of Fig. 6, to the scale of Fig. 6 and Fig. 8 is an enlarged cross-sectional view of our single reservoir tank taken on the line 8—8 of Fig. 6 and to the scale used in that figure.

Referring to the drawings the numeral 10 has been used to designate an ordinary standard elongated water tank. It is to such a tank that we install our invention. In the forward center of the tank 10 we have provided a rectangular housing 11 to house the heating unit and the small animals drinking compartment. This housing is open at its top, has its two ends and back within the stock tank and its front side utilizes a portion of the front side of the main tank as shown in Fig. 3. By this construction the water in the main tank will surround the back and two sides of the housing 11. The front side of the tank 10 has a rectangular opening 12 communicating with the inside of the housing 11. This opening 12 extends from a point substantially above the bottom of the tank to a point near the top of the tank as shown in Fig. 1. The width of this opening is substantially that of the length of the rectangular housing compartment 11. In the forward end portion of the housing 11 are two spaced apart water reservoirs or compartments 13 and 14. These reservoirs are adjacent to the two end walls of the housing 11 respectively, but are spaced apart from the front of the tank, from the bottom of the tank, and from the rear inside wall of the housing 11 as shown in the drawings. This spacing permits the heat to contact the inner end and the back and the front side of each of the open top reservoirs. Any suitable heating means may be used, but we recommend a burner that uses combustible gas under pressure. As the housing 11 is at the center forward side of the main tank, we drill a hole in the sealed tubular rim 15 of the main tank at its rear side and also a hole in the tubular rim 15 at its forward front side and then connect pipes 16 and 16' to the tubular rim in any suitable manner as with standard pipe fittings, for example, to conduct fuel from a source to the compartment 11 as shown in Fig. 4. The conduit 16' then extends downwardly and rearwardly to adjacent the front of the tank and inside the compartment 11 where it terminates in a heater nozzle 17. The flame from the nozzle 17 is directed to the inside rear center of the housing 11 and between the two spaced apart small animal troughs 13 and 14. While the major portion of the fumes from the burner will pass upwardly along the inner side of the compartment 11 and in the spaces 18 between the back inner side of the compartment 11 and the small animals water compartments 13 and 14, much of the heat will be dissipated through the walls of the compartment 11 to the water in the main tank and also to the water in the small animals water compartments 13 and 14. Thus it will be seen that the heat from the burner will not only keep the water from freezing in the main tank, but will also heat and warm the water in the compartments 13 and 14. A certain amount of heat from the burner will even pass to the front sides of the compartments 13 and 14 due to the space 19. To prevent this space 19 from becoming a dead-air trap, we have provided a series of ventilation openings 20 near the top thereof as shown in Fig. 2. The numeral 21 designates a plurality of air holes in the center front of the tank 10 and communicating with the compartment 11 below the compartments 13 and 14. These air passageways 21 furnish oxygen for the burner. The numerals 22 and 23 designate water supply pipes extending from the main tank into the reservoirs 13 and 14 respectively. On the end of each of these pipes that extends into a reservoir is a float actuated valve and float both designated 24. By this arrangement, water from the main tank will be supplied and maintained at a predetermined level within the reservoirs at all times. The water in the reservoirs 13 and 14 will not contaminate the water in the main tank. One of the principal features of our device is the small animals water trough portion which we will now describe. This portion is preferably of one unit and consists chiefly of two trough portions 25 and 26 spaced apart and joined together by connecting portion 27 as shown in Fig. 5. The connecting portion 27 is formed by extending the two inner sides of the troughs and joining them with a vertical panel portion. A handle 28 is secured near the top of the panel portion of the connecting portion 27. Each of the trough portions has its back side curved upwardly and outwardly and then upwardly to provide a flange as shown in Fig. 5. Also, each trough has its upper front side bent upwardly and then downwardly to form a marginal edge hook portion 29. This unit trough portion is designed to rest within the opening 12 of the main tank with the two trough portions 25 and 26 loosely extending into the two reservoirs 13 and 14 respectively. When the unit is in such position, the hook portion 29 will extend over and around the bottom of the opening 12 as shown in Fig. 2 and the top of the panel portion and the upper flange of the two troughs will engage that portion of the main tank above the opening 13 thereby properly holding the trough unit in the main tank for the use of small animals. Holes or water passageways 30 are placed in the back wall of each trough so that water in the reservoirs may readily run into the troughs. These holes are placed above the bottom of the troughs so that dirt or other foreign matter will not readily pass from the troughs back into the reservoir. As the position of the troughs are close to the ground level, small animals may easily drink from the troughs. When the troughs get dirty, it is merely necessary to grasp the handle 28 and swing the top of the unit outwardly as shown by dotted lines in Fig. 2, thereby sloshing the water and dirt out of the troughs. If desired, the unit may be completely removed from the main tank as shown in Fig. 5. By replacing the unit within the tank, fresh clean water will pass from the reservoir through the trough holes and into the troughs for use. The first described swinging movement of the unit is made possible by the hooked portions 29 rotatably extending over the bottom edge of the opening 13.

Numeral 31 designates a detachable lid for the housing 11 and has its front marginal edge extending over the top marginal edge of the main tank as shown in Fig. 2. This lid cover tightly embraces the front and sides of the housing 11 that has its downwardly turned rear marginal edge spaced apart from the rear side of the housing 11 as shown in Fig. 2. This provides a hot gas escape vent in the form of a chimney for the burner 17. A stop member 33 supports the rear end portion of the cover 31 above the rear marginal edge of the housing 11. The numeral 34 designates a downwardly extending baffle plate on the under side of the cover 31 and which extends downwardly within the housing 11. This baffle plate 34 is spaced apart from the rear side of the housing 11 and serves to guide the gases and fumes from the burner out of the passageway 32, while at the same time aiding in the retaining of valuable heat units within the housing.

The numeral 35 designates a conduit extending into the main tank and designed to be in comunication with a source of water under pressure. The numeral 36 designates a float actuated valve for automatically maintaining the water level in the main tank and the same is connected to the inlet pipe 35. This valve and float is positioned at the rear center of the inside of the main tank and directly back of the housing 11. The numeral 37 designates a keeper band of substantial width that extends transversely across the center of the main tank. This band has one end curved to extend around the rear marginal edge of the main tank and its other end curved to extend around the forward marginal edge of the main tank. This relatively wide brace band serves several purposes, i. e., it extends over the cover 31 and prevents the accidental detachment of the cover, it prevents the main tank from spreading when water is placed therein and it extends directly over the float valve to protect the same from being damaged by animals drinking out of the main tank. If desired, it can be provided with a handle to facilitate its removal. The device may be easily serviced by removing the brace band 37 and the cover 31. Partial access to the inside of the housing 11 may be had by swinging the small animals trough unit outwardly or removing it. Thus it will be seen that the burner may easily be ignited without the operator stooping or using auxiliary means to start the burner.

Once installed, our tank requires little if any attention for both small animals, such as hogs and the like, and large animals, such as horses, cows and the like, may use the tank simultaneously. Both the water in the main tank and in the reservoirs will be prevented from freezing. In the warmer months of the year the burner 17, of course, will be turned off and thus the same tank for both the small and large animals will be used throughout the year.

The height of the housing compartment 11 should terminate near the top horizontal plane of the main tank so that the same is substantially above the water level in the main tank.

The tank shown in Figs. 6, 7 and 8 is very similar to that shown in Figs. 1, 2, 3, 4 and 5 except that the reservoirs 13 and 14 have been eliminated. In doing away with these reservoirs certain other changes are necessarily made. The holes 21 are eliminated to make the lower portion of housing 11 watertight. Holes 20 which formerly merely served the function of avoiding a dead air space at the front of housing 11 now serve the different dual function of serving as an air inlet to supply burner 17 with air and also as a water overflow for housing 11. Since the bottom of housing 11 is now a single reservoir, pipe 22 and its float valve 24 are eliminated as unnecessary. Burner 17 must be raised sufficiently to place the burner above the water level in the housing 11 and as is most clearly shown in Fig. 8. The balance of the structure remains exactly the same as in the prior description and repetition of the material set out above is deemed unnecessary. The structure shown in Figs. 6, 7 and 8 is perhaps slightly less efficient in heating water for the small animal watering units than is the form of the tank illustrated in Figs. 1, 2, 3, 4 and 5. The much simplified structure of using the single reservoir more than compensates for this mild shortcoming of the heating arrangement. For users who need to warm the small animal water in a very efficient manner, such as users in very cold areas, for example, may find it expedient to obtain the dual reservoir form of our tank. For general use, however, the single reservoir tank is considered preferable because it is much less expensive to construct and there are fewer moving parts as potential trouble points. Both tanks are used and serviced in substantially the same manner.

Some changes may be made in the construction and arrangement of our heatable water tank without departing from the real spirit and purpose of our invention, and it is our intention to cover by our claims, any modified forms of structure or use of mechanical equivalents which may be reasonably included within their scope.

We claim:

1. In a stock water tank, an elongated water tank open at its top and designed to be used by large animals, a rectangular heating compartment defining means in the tank positioned at its forward center and open at its top; said tank having a rectangular opening in its forward center side communicating with the inside front of said heating compartment defining means at a point above its bottom, two spaced apart reservoirs defining means in said heating compartment adjacent the two ends of said compartment defining means respectively; said reservoir defining means being spaced from the bottom, rear side and front of said heating compartment defining means, two trough units for use of small animals connected together and having their bottom portions normally extending into said two reservoir defining means respectively, a means for connecting the inside of said tank and said reservoir defining means whereby water will be furnished from said tank at a predetermined level within said reservoir defining means, means defining water passageways in said trough units communicating with the reservoir defining means in which they normally reside, a hook portion on the trough units, extending over the bottom marginal edge of the side tank opening; said heating compartment defining means having its upper open end terminating near the top horizontal plane of said tank, a detachable lid on said heating compartment defining means, and a heat producing means in said heating compartment defining means.

2. In a stock water tank, a water tank open at its top and designed to be used by large animals, a rectangular heating compartment defining means in the tank positioned at its forward center and open at its top; said tank having an opening in its forward center side communicating with the inside front of said heating compartment defining means at a point above its bottom, two spaced apart reservoir defining means in said heating compartment defining means adjacent the two ends of said compartment respectively; said reservoir defining means being spaced from the bottom, rear side and front of said heating compartment defining means, two trough units for use of small animals connected together and having their bottom portions normally extending into said two reservoir defining means respectively, a means for connecting the inside of said tank and said reservoir defining means at a predetermined level within said reservoir defining means, water passageways defining means in said trough units communicating with the reservoir defining means in which they normally reside, a hook portion on the trough units, extending over the bottom marginal edge of the side tank opening; said heating compartment defining means having its upper open end terminating near the top horizontal plane of said tank, a detachable lid on said heating compartment defining means, and a heat producing means in said heating compartment defining means.

3. In a stock water tank, an elongated water tank open at its top and designed to be used by large animals, means defining a rectangular heating compartment in the tank positioned at its forward center and open at its top; said tank having a rectangular opening in its forward center side communicating with the inside front of said means defining a heating compartment at a point above its bottom, means defining two spaced apart reservoirs in said means defining a heating compartment adjacent the two ends of said means defining a heating compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said tank and said means defining reservoirs whereby water will be furnished from said tank at a predetermined level within said means defining reservoirs, means defining water passageways in said trough units communicating with the reservoir in which they normally reside, a hook portion on the trough units, extending over the bottom marginal edge of the side tank opening; means defining said heating compartment having its upper open end terminating near the top horizontal plane of said tank, a detachable lid on said means defining a heating compartment having a downwardly extending rim flange on its two ends and back side with its rear side portion extending spaced above and to the rear of the back side of said means defining a heating compartment, and a heat producing means in said means defining a heating compartment.

4. In a stock water tank, an elongated water tank open at its top and designed to be used by large animals, means defining a rectangular heating compartment in the tank positioned at its forward center and open at its top; said tank having a rectangular opening in its forward center side communicating with the inside front of said means defining a heating compartment at a point above its bottom, means defining two spaced apart reservoirs in said means defining a heating compartment adjacent the two ends of said means defining a heating compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said tank and said means defining reservoirs whereby water will be furnished from said tank at a predetermined level within said means defining reservoirs, means defining water passageways in said trough units communicating with the means defining the reservoir in which they normally reside, a hook portion on the trough units, extending over the bottom marginal edge of the side tank opening; said means defining a heating compartment having its upper open end terminating near the top horizontal plane of said tank, a detachable lid on said means defining a heating compartment having a downwardly extending rim flange on its two ends and back side with its rear side portion spaced above and extending to the rear of the back side of said means defining a heating compartment, and a heat producing means in the rear central bottom of said means defining a heating compartment.

5. In a stock water tank, an elongated water tank open at its top and designed to be used by large animals, means defining a rectangular heating compartment in the tank positioned at its forward center and open at its top; said tank having a rectangular opening in its forward center side communicating with the inside front of said heating compartment at a point above its bottom, means defining two spaced apart reservoirs in said heating compartment adjacent the two ends of said compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said means defining tank and said reservoirs whereby water will be furnished from said tank at a predetermined level within said means defining reservoirs, means defining water passageways in said trough units communicating with the means defining the reservoir in which they normally reside, a hook portion on the trough units, extending over the bottom marginal edge of the side tank opening; said means defining a heating compartment having its upper open end terminating near the top horizontal plane of said tank, a detachable lid on said means defining a heating compartment having a downwardly extending rim flange on its two ends and back side with its rear side portion extending spaced above and to the rear of the back side of said means defining a heating compartment, a heat producing means in the rear central bottom of said means defining a heating compartment, and a downwardly extending baffle on the underside of said lid.

6. In a stock water tank, an elongated water tank open at its top and designed to be used by large animals, means defining a rectangular heating compartment in the tank positioned at its forward center and open at its top; said tank having a rectangular opening in its forward center side communicating with the inside front of said heating compartment at a point above its bottom, means defining two spaced apart reservoirs in said means defining a heating compartment adjacent the two ends of said means defining a heating compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said tank and said reservoirs whereby water will be furnished from said tank at a predetermined level within said means defining reservoirs, means defining water passageways in said trough units communicating with the means defining the reservoir in which they normally reside, a hook portion on the trough units, extending over the bottom marginal edge of the side tank opening; said means defining heating compartment having its upper open end terminating near the top horizontal plane of said tank, a detachable lid on said means defining a heating compartment having a downwardly extending rim flange on its two ends and back side with its rear side portion spaced above and extending to the rear of the back side of said means defining a heating compartment, a heat producing means in the rear central bottom of said means defining a heating compartment, a downwardly extending baffle on the underside of said lid, and means defining air passageways in the front of said tank communicating with the outside atmosphere and the inside forward bottom of said means defining a heating compartment.

7. In a stock water tank, an elongated water tank open at its top and designed to be used by large animals, means defining a rectangular heating compartment in the tank positioned at its forward center and open at its top; said tank having a rectangular opening in its forward center side communicating with the inside front of said means defining a heating compartment at a point above its bottom, means defining two spaced apart reservoirs in said heating compartment adjacent the two ends of said means defining a heating compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said means defining tank and said reservoirs whereby water will be furnished from said tank at a predetermined level within said means defining reservoirs, means defining water passageways in said trough units communicating with the means defining the reservoir in which they normally reside, a hook portion on the trough units, extending over the bottom marginal edge of the side tank opening; said means defining a heating compartment having its upper open end terminating near the top horizontal plane of said tank, a detachable lid on said means defining a heating compartment having a downwardly extending rim flange on its two ends and back side with its rear side portion spaced above and extending to the rear of the back side of said means defining a heating compartment, a heat producing means in the rear central bottom of said means defining a heating compartment, a downwardly extending baffle on the underside of said lid, means defining air passageways in the front of said means defining a heating tank communicating with the outside atmosphere and means defining the inside forward bottom of said means defining a heating compartment, and means defining air passageways in the forward side of said tank directly below its rectangular opening communicating with the outside atmosphere and the forward upper sides of said means defining reservoirs.

8. In a stock water tank, an elongated water tank open at its top and designed to be used by large animals, means defining a rectangular heating compartment in the tank positioned at its forward center and open at its top; said tank having a rectangular opening in its forward center side communicating with the inside front of said means defining a heating compartment at a point above its bottom, means defining two spaced apart reservoirs in said means defining a heating compartment adjacent the two ends of said means defining a heating compartment respectively; said means defining reservoirs being spaced from the bottom, rear side and front of said means defining a heating compartment, two trough units for use of small animals connected together and having their bottom portions normally extending into said means defining two reservoirs respectively, a means for connecting the inside of said means defining a tank and said reservoirs whereby water will be furnished from said means defining a tank at a predetermined level within said means defining reservoirs, means defining water passageways in said trough units communicating with the means defining the reservoir in which they normally reside, a hook portion on the trough units, extending over the bottom marginal edge of the side tank opening; said means defining a heating compartment having its upper open end terminating near the top horizontal plane of said tank, a detachable lid on said means defining a heating compartment, a heat producing means in said means defining a heating compartment, a float valve means in said tank and designed to be in communication with a source of water under pressure, and a plate bar of substantial width detachably extending across said tank and extending above and over said float valve means and said lid.

9. In a water tank open at its top and designed to be used by large animals, means defining a heating compartment in the tank having one of its inside walls common with a portion of the side wall of the water tank and open at its top; said tank having an opening in its side communicating with the inside of said means defining a heating compartment at a point above its bottom, a trough unit for use of small animals having its bottom portion normally extending into said means defining a heating compartment, means defining a water passageway in said trough unit, a hook portion on said trough unit extending over the bottom marginal edge of said tank opening to hingedly support said trough relative to said tank wall that is common with said heating compartment, a means for furnishing a supply of water from said water tank into said means defining a heating compartment and into contact with the lower portion of said trough unit when said trough unit is in a normal position within said means defining a heating compartment; said means defining a heating compartment having its upper open end terminating near the top horizontal plane of said tank, a detachable lid on said means defining a heating compartment having a downwardly extending rim flange on at least a portion of its rim area and having at least a portion of its horizontal plane above the upper marginal edge of at least a portion of said means defining a heating compartment to form a hot gases outlet; said flange portion being in a vertical plane outside of and spaced apart from the vertical plane of said means defining a heating compartment that is adjacent to said flange, and a baffle member extending downwardly from the underside of said lid, in said heating compartment and means defining a spaced apart from the hot gases outlet formed by said lid and means defining a heating compartment.

10. In a water tank open at its top, means defining a heating compartment in said tank having a portion of its side wall common with a portion of the side wall of the water tank and open at its top; said tank having an air opening in its side portion that is common with the side portion of said means defining a heating compartment; said means defining a heating compartment having its upper open end terminating near the top horizontal plane of said means defining a tank, a detachable lid on said means defining a heating compartment having a downwardly extending flange on at least a portion of its peripheral area and having at least a portion of its horizontal plane above the upper marginal edge of at least a portion of said means defining a heating compartment to form a hot gases outlet; said flange portion being in a vertical plane outside of and spaced apart from the vertical plane of said means defining a heating compartment that is adjacent to said flange, a baffle member extending downwardly from the underside of said lid and said means defining a heating compartment and spaced apart from the hot gases outlet formed by said lid and means defining a heating compartment.

11. In a watering tank for large and small animals, a main tank, a wall secured to the bottom and at different points to a side portion of said main tank to form a housing in a water tight relationship to the balance of said main tank; said housing being open at its top; said wall extending upwardly to a point adjacent to the top edge of said main tank, an opening in the side of said main tank connecting said housing to the surrounding atmosphere, a detachably mounted trough element inserted in said opening; said trough element having an opening near its bottom, a means for introducing water into said main tank, a conduit mounted in said wall for introducing water into said housing and into contact with the lower portion of said trough element, a valve on the end of said conduit controlling the level of water in the area enclosed by said wall at a lower level than the level of the water in the balance of said main tank, a heating element in said housing above the water level therein for heating the water in both areas of said tank, a detachabe lid on said housing having a downwardly extending flange on at least a portion of its peripheral area and having at least a portion of its horizontal plane above the upper marginal edge of at least a portion of said housing to form a hot gases outlet; said flange portion being in a vertical plane outside of and spaced apart from the vertical plane of said housing that is adjacent to said flange, a baffle member extending downwardly from the underside of said lid and said housing and spaced apart from the hot gases outlet formed by said lid and housing.

12. In a water tank open at its top and designed to be used by large animals, means defining a heating compartment in the tank having one of its inside walls common with a portion of the side wall of the water tank and open at its top; said tank having a hollow sealed strengthening rim extending around its top; and said tank having an opening in its side communicating with the inside of said means defining a heating compartment at a point above its bottom, a trough unit for use of small animals having its bottom portion normally extending into said means defining a heating compartment, means defining a water passageway in said trough unit, a hook portion on said trough unit extending over the bottom marginal edge of said tank opening to hingedly support said trough relative to said tank wall that is common with said heating compartment, a means for furnishing a supply of water from said water tank into said means defining a heating compartment and into contact with the lower portion of said trough unit when said trough unit is in a normal position within said means defining a heating compartment; said means defining a heating compartment having its upper open end terminating near the top horizontal plane of said tank, a detachable lid on said means defining a heating compartment having a downwardly extending rim flange on at least a portion of its rim area and having at least a portion of its horizontal plane above the upper marginal edge of at least a portion of said means defining a heating compartment to form a hot gases outlet; said flange portion being in a vertical plane outside of and spaced apart from the vertical plane of said means defining a heating compartment that is adjacent to said flange, a baffle member extending downwardly from the underside of said lid, in said means defining a heating compartment and spaced apart from the hot gases outlet formed by said lid and means defining a heating compartment, means defining a fluid fuel inlet formed in one portion of the hollow sealed strengthening rim of said tank, means defining a fluid fuel outlet formed in another portion of the hollow sealed strengthening rim of said tank, a conduit connecting said fluid fuel inlet to a source of fluid fuel, a fluid fuel burner secured in said heating compartment, and a conduit connecting said fluid fuel burner to said fluid fuel outlet.

DONALD J. DONAHOE.
PAUL J. DONAHOE.

References Cited in the file of this patent
UNITED STATES PATENTS

| Number | Name | Date |
|---|---|---|
| 1,229,557 | Weaver | June 12, 1917 |
| 2,532,999 | Donahoe et al. | Dec. 5, 1950 |